Patented Apr. 3, 1945

2,372,666

UNITED STATES PATENT OFFICE 2,372,666

ADHESIVE STARCH COMPOSITION AND METHOD OF MAKING SAME

James E. Fenn, Troy, Ohio, assignor, by mesne assignments, to Stein, Hall & Co. Inc., a corporation of New York No Drawing. Application February 8, 1941,
Serial No. 378,053

9 Claims. (Cl. 106—210)

This invention relates to an adhesive composition and a method for preparing this adhesive composition. The adhesive composition has as one particular utility its use for laminating cloth to cloth or paper, or paper to paper or foil.

Starch and dextrine as well as the combination of cooked and raw, or unconverted or ungelatinized starches have been used in the past and are being used at present for this purpose but all these materials have certain disadvantages and difficulties which are encountered in their present use.

Dextrines and converted starches, whether they are used alone or as carriers for unconverted starches, are, comparatively speaking, high priced materials. Even if they are used as carriers, for the ungelatinized starch as for instance in Bauer's Patents Nos. 2,197,754, 2,051,025, 2,102,937 and 2,212,557, they raise the cost of making these adhesives to a considerable extent. Furthermore, these patents specify the use of a major proportion of ungelatinized starch being present in the composition which requires—in the case of laminating paper to cloth—high-grade tapioca or potato starches, or, in case of laminating paper to paper or making corrugated liners, the use of a large amount of urea or alkali to lower the gelatinization point of the cheaper starches like corn, wheat, etc.

Another difficulty with such adhesives is the fact that unless more than 50% water is used in the laminating composition, a large amount of ungelatinized starch remains in its original form and, consequently, it is not utilized to its full extent. Larger amounts of water, however, result in wrinkling of the paper, excessive shrinkage of the material and reduced speeds in machine operations.

The adhesive composition of this invention consists of a converted starch and unconverted or ungelatinized starch, the proportions of each being from 55 to 90% of converted starch and from 45 to 10% of unconverted or ungelatinized starch.

For the converted starch I have found it preferable to use high grade tapioca or potato starches—these two being obtainable commercially in very uniform qualities and requiring the least amount of converting material, although any other starch, such as is made from corn, wheat, sago, rice, or other cereals, can be used, although these require a larger amount of enzyme and very close control from batch to batch. As converting materials I use any of the commercially obtainable enzymes. These enzymes are naturally occurring substances that have the power to solubilize starches by hydrolizing them to simpler sugars if conditions are most favorable. By arresting this hydrolization process at the desired stage, the conversion to simpler sugars is only partial, i. e., only a small proportion of the starch is being hydrolized completely. Any one or more of the commercially available enzymes can be used for this purpose, the cheapest and most common being malt diastase extracted from sprouting barley, diastase or amylase extracted from molds, mostly of the aspergillus family, and diastase or amylase extracted from the pancreas of animals.

As each one of these enzymes converts starch to different sugars, the handling is slightly different with each enzyme, to produce the desired end-product, but anyone familiar with the art, will be able to establish his method after a few trials. I will describe only one procedure with malt diastase but it should be understood that in the claims which follow there is no limitation to this particular enzyme.

Formula No. 1

600 lbs. of high-grade tapioca starch; stir it into 800 lbs. of cold water, add 4 oz. of dried malt diastase, and while agitating, bring the temperature of this mix to 160° F. by live steam or by heating the outer jacket of the kettle. When this temperature is reached, I shut off the steam or heat supply to jacket and let the mix stand for 30 minutes, then heat it up to 190° F. to kill or inactivate the enzyme. I then add 50 lbs. of urea and 20 lbs. of common salt. I then add 150 lbs. cold water and bring down the temperature of the cooked mix to about 120° F. I then add 400 lbs. of medium grade tapioca starch or sago starch and stir it until a homogeneous mixture is obtained.

The urea and salt serve as agents to prevent the thickening-up or pasting of the material on cooling and are present from 5 to 10% in the mix, the optimum being about 7% based on total dry materials of the composition. Such an agent may be called a pasting inhibitor.

There are a large number of substances that can be used for this latter purpose, as: resorcin, sodium-potassium- or aluminum-acetate, calcium chloride, chloral hydrate, sodium salicylate, etc., and I prefer urea and common salt, these two being the cheapest and entirely adequate for this purpose.

Formula No. 2

| | |
|---|---|
| Potato starch | lbs 600 |
| Cold water | lbs 800 |
| Add | |
| Dried malt diastase | oz 3½ |

While agitating I bring the temperature of this mix to 160° F. by live steam or by heating the outer jacket of the kettle. At this point I shut off the live steam or the heat supply of the outer jacket, and let the mix stand for 25 minutes. Then I heat it up to 190° F. to kill or inactivate the enzyme and I then add 30 lbs. of urea and 40 lbs. of common salt. I then add 150 lbs. of cold water and cool the mix to about 120° F. 400 lbs. of medium grade tapioca starch or sago starch are then added, and I stir it until a homogeneous mixture is obtained.

If other starches are used for conversion, like corn, wheat or rice, etc., the procedure is modified somewhat. The conversion temperature raised about 5° F. and a larger amount of diatase is added. The conversion time is also lengthened to 40 to 60 minutes, depending on the particular kind of starch used. In pancreatic enzyme or an amylase prepared from molds is used, the temperatures and conversion time will have to be modified slightly to obtain the same results.

The converted product must not have more than 6% reducing sugars present which can be determined by any one of the well known methods (Munson & Walker, Benedict, Fehling, etc.) or else it will not have the best adhesive qualities. If the conversion is not carried to this point, the product will tend to thicken-up or paste excessively on cooling unless much larger amounts of urea, salt and alkali or other chemicals are used. This is undesirable as these materials tend to soften the product by absorbing too much moisture from the atmosphere or by damaging the goods by chemical action.

By using starches exclusively for the converted material and by utilizing lower grades of starches for the unconverted or ungelatinized material the use of this adhesive composition effects a considerable saving over the other known and used materials. Furthermore, by having the larger part of the adhesive in the converted or gelatinized stage, more water is availble for the ungelatinized starch to absorb and it is utilized to a much fuller extent than in the old methods. Consequently, lesser amounts of adhesive material is used which results in a further saving or reduction of cost. At the same time, because the evaporation of the water is slowed down by the larger amount of gelatinous material present, the shrinkage is very much less than with the old methods. This also effects a material having.

The combining or laminating of materials with this adhesive composition does not present any difficulties to anyone versed in the art and is accomplished by the same type and kind of machines which are used throughout the industry.

Having thus described my invention, what I claim as new and desire to secure by Letters Patent is:

1. An adhesive composition consisting of enzyme converted starch, ungelatinized starch and a pasting-inhibitor, the proportions being 55 to 90% of converted starch, 45 to 10% of ungelatinized starch and 5 to 10% of a pasting inhibitor, the pasting-inhibitor being added after the conversion of the starch with the enzyme has been completed.

2. An adhesive starch composition in which the major proportion of the starch content is in enzyme converted form, with a minor proportion in ungelatinized form and in which a pasting inhibitor is incorporated in a proportion less than 10%, the pasting-inhibitor being added after the conversion of the starch with the enzyme has been completed.

3. An adhesive starch composition in which a proportion greater than 55% of the starch content is in enzyme converted form and in which a lesser proportion than 45% is in ungelatinized form with a pasting inhibitor incorporated in a proportion less than 10%, the pasting-inhibitor being added after the conversion of the starch with the enzyme has been completed.

4. An adhesive starch composition in which a proportion greater than 55% of the starch content is in enzyme converted form and in which a lesser proportion than 45% is in ungelatinized form with a basic metal chloride pasting inhibitor incorporated in a proportion less than 10%, said pasting inhibitor being of the class consisting of sodium chloride, potassium chloride, calcium chloride, zinc chloride and magnesium chloride.

5. A method of making an adhesive starch composition which consists in mixing a high grade starch of the class consisting of tapioca and potato starch with water, adding a minor proportion of an enzyme capable of hydrolizing the starch, warming the mixture so as to partially hydrolize the starch, subsequently heating the solution to a degree sufficient to inactivate the enzyme, then adding a small percentage of pasting inhibitor having a pasting inhibiting action on the enzyme converted material, cooling down the mixture and adding a lesser percentage of a medium or lower grade starch of the class consisting of tapioca, potato and sago starch than was originally dissolved, and stirring the ingredients until a homogeneous mixture is provided.

6. An adhesive starch composition in which a proportion greater than 55% of the starch content is in enzyme converted form and in which a proportion less than 45% is in ungelatinized form with a pasting inhibitor incorporated in a proportion less than 10%.

7. An adhesive starch composition in which a proporation greater than 55% of the starch content is in enzyme converted form and in which a lesser proportion than 45% is in ungelatinized form with a basic metal chloride pasting inhibitor incorporated in a proportion less than 10%.

8. The method of preparing an adhesive starch composition which comprises converting a starchy material with an enzyme to form an enzyme converted starch, thereafter adding to the enzyme converting starch a pasting inhibitor, adding to the mixture an ungelatinized starch and stirring the ingredients until a homogeneous mixture is obtained with the ungelatinized starch suspended in the enzyme converted starch.

9. A method of preparing an adhesive starch composition which comprises mixing a starch with water, adding a minor proportion of an enzyme capable of hydrolizing the starch, warming the mixture so as to partially hydrolize the starch, subsequently heating the mixture to a degree sufficient to inactivate the enzyme, thereafter adding a minor proportion of a pasting inhibitor to the mixture having a pasting inhibiting action on the enzyme converted material, cooling the mixture, adding a minor proportion of an ungelatinized starch and stirring the ingredients until a homogeneous mixture is obtained.

JAMES E. FENN.

CERTIFICATE OF CORRECTION.

Patent No. 2,372,666.　　　　　　　　　　　　　　　April 3, 1945.

JAMES E. FENN.

It is hereby certified that error appears in the printed specification of the above numbered patent requiring correction as follows: Page 2, first column, line 9, for "diatase" read --diastase--; line 12, for "In" read --If--; line 45, for "having" read --saving--; and that the said Letters Patent should be read with this correction therein that the same may conform to the record of the case in the Patent Office.

Signed and sealed this 31st day of July, A. D. 1945.

Leslie Frazer (Seal)　　　　　　　　　　　Acting Commissioner of Patents.